July 9, 1940.  T. T. BROWN  2,207,576
METHOD AND APPARATUS FOR REMOVING SUSPENDED MATTER FROM GASES
Filed July 26, 1938
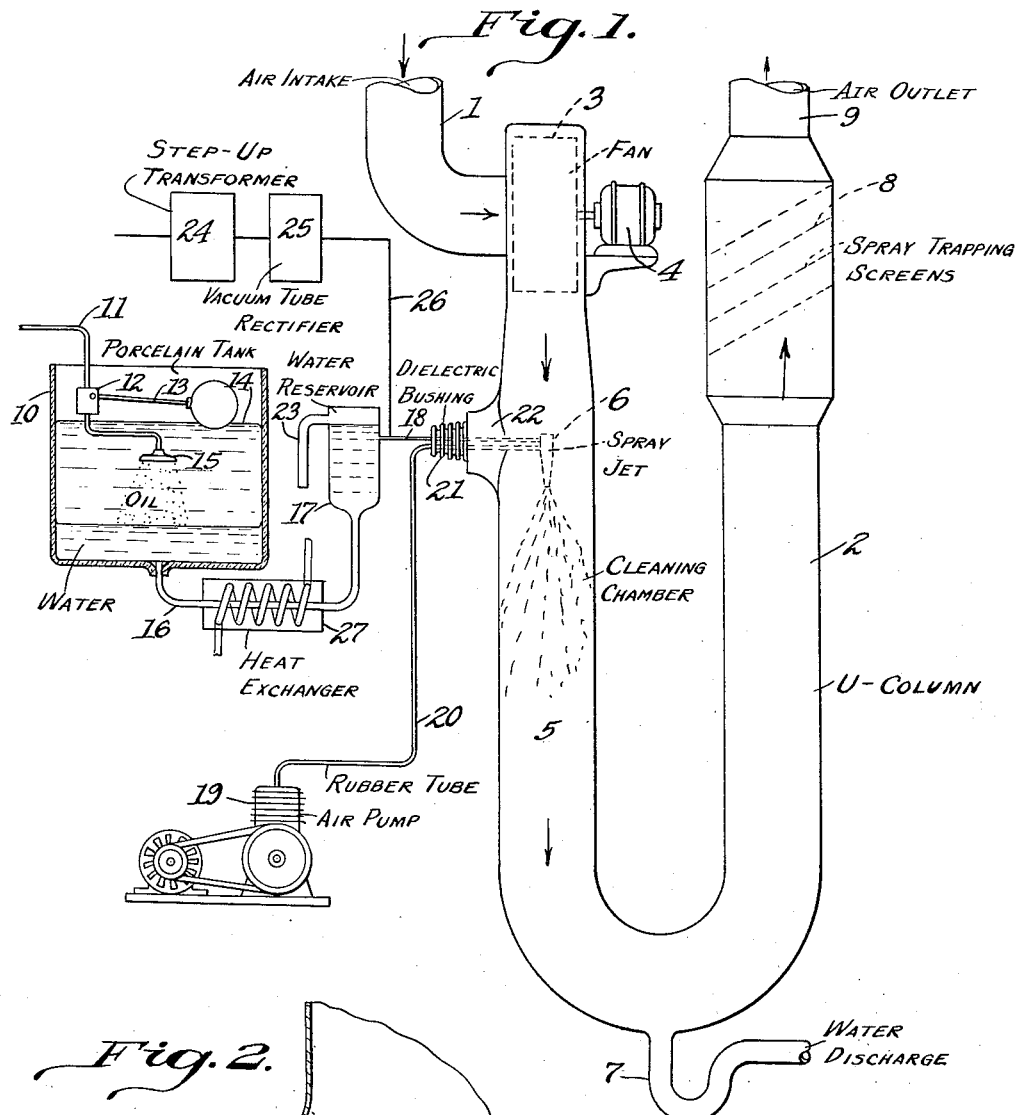
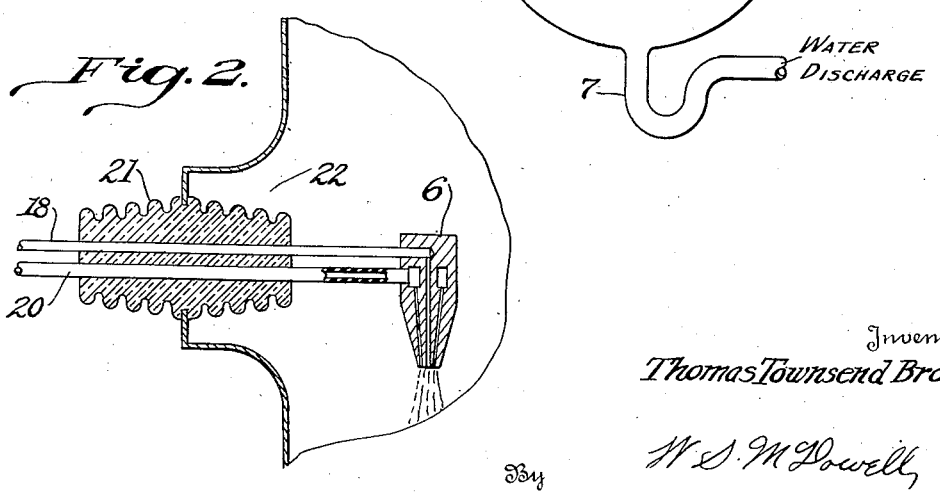
Inventor
Thomas Townsend Brown
By W. S. McDowell
Attorney Patented July 9, 1940

2,207,576

UNITED STATES PATENT OFFICE 2,207,576

METHOD AND APPARATUS FOR REMOVING SUSPENDED MATTER FROM GASES

Thomas Townsend Brown, Zanesville, Ohio

Application July 26, 1938, Serial No. 221,373

8 Claims. (Cl. 183—7)

This invention relates to the cleaning and purification of gases containing suspended solids, and has particular reference to the removal of foreign particles from atmospheric air.

It is an object of the present invention to continuously remove suspended matter from air or other gases by bringing the latter into intimate contact with a finely divided and continuously electrified liquid spray, the spray being developed within an electrically grounded chamber, whereby particles of dust, smoke, bacteria or the like in the air are attracted electrostatically to the minute droplets of the spray which bear an electrical charge of high-potential, the charge itself being attracted to the grounded walls of the chamber and the water or other liquid, containing the removed particles, being separately discharged from the chamber with respect to the discharge of the purified air or other gas.

For a further understanding of the invention, reference is to be had to the following description and the accompanying drawing, wherein:

Fig. 1 is a diagrammatic view, partly in side elevation and vertical section, of apparatus employed in carrying out the present invention;

Fig. 2 is an enlarged vertical sectional view disclosing the insulated nozzle support.

Referring more particularly to the apparatus diagrammatically illustrated in Figs. 1 and 2, air or other gas to be cleaned and purified is drawn into the air intake 1 provided in the upper end of a substantially U-shaped column 2. This operation may be effected by means of a fan 3 driven by an electric motor 4. The air is thus positively advanced into and through a cleaning chamber 5 in which is contained a spray jet 6. An electrified spray of water, or other liquid, issues from the jet 6 and is thoroughly intermixed with the air passing through the cleaning chamber. Particles of dust, smoke, bacteria or the like in the air are attracted electrostatically to the minute droplets of spray, while the spray itself is attracted to the electrically grounded walls of the chamber 5. The water, bearing the removed particles, thence runs into the trap 7 and may be discharged to any suitable point of drainage. Any remaining spray is caught by the screens 8, and the clean or purified air is discharged from the U-column by means of the air outlet indicated at 9. Auxiliary apparatus used in the successful operation of the device may comprise the following:

Water, obtained from pressure mains, is conducted to a tank 10 by way of a pipe 11. This pipe contains a valve 12 controlled by means of a float equipped arm 13. The tank contains a body of oil, the level of which is indicated at 14 and on which the float 13 operates. The water which passes through the valve 12 is discharged into and under the surface of the oil by means of a spray head 15. The droplets of water are each electrically insulated from the other and from the spray head 15 and descend through the body of oil to the reservoir of water at the bottom of the tank 10, the latter being preferably formed from porcelain.

The water, free from the oil and lying lowest in the tank, passes through a pipe 16 to a reservoir 17 and reaches a level very slightly below the oil level indicated at 14 in the tank 10. The water then flows by gravity through a substantially horizontally disposed tube 18 to the spray jet 6, where it is forced by air pressure and atomized downwardly into the chamber 5. Air under pressure for this purpose is supplied by means of the motor driven pump or compressor 19, the air passing from the latter by means of a rubber tube 20, electrically insulated from adjoining metallic apparatus, and is conveyed by the tube to the spray jet 6. An insulated bushing 21 of a molded dielectric material carries both the air and water tubes 18 and 20, respectively, to the spray jet. This bushing is recessed in a wall of the chamber 5, as indicated at 22, to diminish air resistance in the chamber 5 or the formation of undesired eddies. An emergency drain 23 is connected with the reservoir 17 to permit water to overflow in the event the valve 12 fails to hold the water level in the reservoir at the proper position.

The necessary high electrical potential of direct current can be produced in a number of different ways. In general, however, any potential of approximately ten kilovolts D. C., or over, applied to the spray jet 6 will accomplish the desired cleaning effect. A simple way of obtaining the high potential is by the use of step-up transformers and vacuum tube rectifiers. Such an arrangement is shown diagrammatically in the drawing at 24 and 25, respectively. The high voltage lead 26 is attached to the metallic water tube 18. The polarity of the charge on the jet 6 produces but little difference in the functioning of the apparatus in the removal of solids from gases. The pipe 16 may be surrounded by means of a heat exchanger 27 so that the water or other liquid flowing therethrough may be either artificially cooled or heated to obtain the desired temperatures of the water droplets discharged from the jet 6. As stated, the walls of the tank 10 are formed from a dielectric material, and since the water in passing through the body of oil contained in said tank, is in a finely divided form, with each droplet of water surrounded by a body of oil, a satisfactory insulation is produced by means of which a continuously inflowing stream of water may be supplied to the spray jet 6 without loss of the desired electrical charge thereon.

The apparatus described is particularly useful in air conditioning systems for all types of buildings or other enclosed space and serves to maintain automatically a sterile, dust-free atmosphere of desired relative humidity.

What is claimed is:

1. The method of removing suspended impurities from atmospheric air which comprises producing in a confined zone a liquid spray wherein the individual droplets thereof bear a high-potential electrical charge, simultaneously forcing through said zone and the liquid spray continuously maintained therein air containing suspended impurities, whereby to cause the latter to be attracted electrostatically to the electrically charged liquid droplets and separated from the air, continuously supplying liquid in a restricted flow stream to said zone to form said spray, applying a high-potential electrical charge to the stream of liquid immediately prior to the formation of said spray, and while maintaining sustained flow of the liquid from its source of supply to the confined spray zone and prior to the application of the electrical charge thereto passing the same in a divided form through a fluid having dielectric properties.

2. In the process of separating suspended impurities from gases by passing such gases through an electrified spray of liquid contained in a confined zone, the steps which comprise advancing a confined stream of liquid to the spray producing area, applying a high-potential electrical charge to the stream of liquid immediately prior to the formation of the spray, and interrupting the stream of liquid flowing to said spray area and in advance of the point of electrical charge thereto by passing the same in a dispersed form through a fluid body possessing electrical insulating properties.

3. In the process of separating suspended impurities from gases by passing such gases through an electrified spray of liquid contained in a confined zone, the steps which comprise advancing a confined stream of liquid to the spray producing area, applying a high-potential electrical charge to the stream of liquid immediately prior to the formation of the spray, and interrupting the stream of liquid flowing to said spray area and in advance of the point of electrical charge thereto by passing the same through a fluid body possessing electrical insulating properties, the liquid stream when passing through said last-named body being in a divided form so that each particle thereof is surrounded by said fluid body.

4. In apparatus for purifying air by the removal of suspended particles therefrom, comprising a body having a substantially U-shaped passage formed therein, means for advancing air through said passage, a spray head positioned in said passage and electrically insulated from the walls thereof, means for supplying liquid to said spray head including a receiver having dielectric walls, said receiver containing a body of a dielectric liquid through which the liquid flowing to said spray head is passed in a divided form, and means for applying a high-potential electrical charge to said first-named liquid as it passes from said receiver to said spray head.

5. Air conditioning and purifying apparatus comprising a conduit through which air is positively advanced, a spray head positioned in said conduit and electrically insulated from the walls thereof, a receiver adapted to contain a body of an oleaginous liquid, means for passing a spray liquid in the form of droplets through said oleaginous liquid, a pipe line for conducting the spray liquid following its passage through the oleaginous liquid to said spray head, and means for applying a high-potential electrical charge to the spray liquid during its passage through said pipe line.

6. Air conditioning and purifying apparatus comprising a conduit, an atomizing nozzle arranged in said conduit and electrically insulated from the walls thereof, means for supplying said nozzle with a spray-forming liquid including a tank having dielectric walls, said tank being adapted to contain a body of a dielectric liquid, a spray liquid supply line entering said tank and terminated in a spray head immersed in the dielectric liquid of said tank, a pipe line leading from the bottom of said tank to said atomizing nozzle, an overflow receptacle in said pipe line, means for applying a high-potential charge of direct current to the spray forming liquid between said reservoir and said nozzle, and means for controlling the temperature of the spray forming liquid following discharge thereof from said tank.

7. In apparatus for purifying air by the removal of suspended particles therefrom, comprising a body having a substantially U-shaped passage formed therein, means for advancing air through said passage, a spray head positioned in said passage and electrically insulated from the walls thereof, means for supplying liquid to said spray head including a receiver having dielectric walls, said receiver containing a body of a dielectric fluid through which the liquid flowing to said spray head is passed in a divided form, and means for applying a high-potential electrical charge to said liquid as it passes from said receiver to said spray head.

8. Apparatus for removing fine solids from atmospheric and other gases of the type wherein a confined stream of water under pressure is released from a spray nozzle, the stream of water having continuously applied thereto an electrical charge and wherein gases to be purified are brought into contact with the electrically charged droplets of water issuing from the spray nozzle, said apparatus comprising a receptacle for a dielectric fluid, and means for passing water prior to an application of an electrical charge thereto in a dispersed form through the dielectric fluid, whereby to provide for continuous flow of the water and insulation thereof from its source of supply.

THOMAS TOWNSEND BROWN.